US008402816B2

(12) United States Patent
Rohr

(10) Patent No.: US 8,402,816 B2
(45) Date of Patent: Mar. 26, 2013

(54) SYSTEMS AND METHODS FOR DETECTING LEAKS

(75) Inventor: Daniel J. Rohr, Wildwood, MO (US)

(73) Assignee: Schneider Electric IT Corporation, West Kingston, RI (US)

(*) Notice: Subject to any disclaimer, the term of this patent is extended or adjusted under 35 U.S.C. 154(b) by 280 days.

(21) Appl. No.: 12/981,728

(22) Filed: Dec. 30, 2010

(65) Prior Publication Data
US 2012/0167668 A1 Jul. 5, 2012

(51) Int. Cl.
G01M 3/04 (2006.01)
G01M 3/24 (2006.01)

(52) U.S. Cl. .......................... 73/40.5 A; 73/40; 73/45.5

(58) Field of Classification Search .............. 73/40–49.8
See application file for complete search history.

(56) References Cited

U.S. PATENT DOCUMENTS

| 4,402,213 | A | * | 9/1983 | Hogan | ................ 73/40.5 R |
| 5,347,850 | A | * | 9/1994 | Tuma | .................... 73/49.2 |
| 5,473,935 | A | * | 12/1995 | Richter | ................ 73/40.5 R |
| 6,102,617 | A | | 8/2000 | Hampton | |
| 6,745,590 | B1 | | 6/2004 | Johnson et al. | |
| 6,873,263 | B1 | * | 3/2005 | Hohman | ................ 340/602 |
| 6,899,122 | B1 | * | 5/2005 | Mele | ................ 137/312 |
| 6,959,558 | B2 | | 11/2005 | Bean, Jr. et al. | |
| 6,967,283 | B2 | | 11/2005 | Rasmussen et al. | |
| 7,046,514 | B2 | | 5/2006 | Fink et al. | |
| 7,082,959 | B1 | * | 8/2006 | Franklin | ................ 137/312 |
| 7,165,412 | B1 | | 1/2007 | Bean, Jr. | |
| 7,173,820 | B2 | | 2/2007 | Fink et al. | |
| 7,293,666 | B2 | | 11/2007 | Mattlin et al. | |
| 7,325,410 | B1 | | 2/2008 | Bean, Jr. | |
| 7,365,973 | B2 | | 4/2008 | Rasmussen et al. | |
| 7,406,839 | B2 | | 8/2008 | Bean et al. | |
| 7,418,825 | B1 | | 9/2008 | Bean, Jr. | |
| 7,529,086 | B2 | | 5/2009 | Fink et al. | |
| 7,561,057 | B2 | * | 7/2009 | Kates | ................ 340/605 |
| 7,603,874 | B2 | | 10/2009 | Fink et al. | |

(Continued)

FOREIGN PATENT DOCUMENTS
DE 2934928 A1 3/1981
EP 1970651 A1 9/2008
(Continued)

OTHER PUBLICATIONS

International Search Report for PCT/US2010/035415 mailed Sep. 2, 2010.

(Continued)

Primary Examiner — David Rogers
(74) Attorney, Agent, or Firm — Lando & Anastasi, LLP

(57) ABSTRACT

A system for detecting leaks on a surface, such as a floor or a bottom of an equipment cabinet, includes a sound wave generator configured to generate sound waves, a tube having a first end coupled to the sound wave generator, a second end opposite the first end, and a plurality of openings formed in the tube, and a sound wave receiver coupled to the second end of the tube. The sound wave receiver is configured to detect sound waves generated by the sound wave generator that travel through the tube. The arrangement is such that sound waves are blocked from detection by the sound wave receiver when fluid enters the tube through the plurality of openings in the tube thereby indicating a fluid leak on the surface.

18 Claims, 2 Drawing Sheets

U.S. PATENT DOCUMENTS

| | | |
|---|---|---|
| 7,681,404 B2 | 3/2010 | Bean, Jr. |
| 7,681,410 B1 | 3/2010 | Bean, Jr. |
| 7,684,193 B2 | 3/2010 | Fink et al. |
| 7,775,055 B2 | 8/2010 | Bean et al. |
| 2006/0179854 A1 | 8/2006 | Esslinger |
| 2007/0074537 A1 | 4/2007 | Bean et al. |
| 2007/0163748 A1 | 7/2007 | Rasmussen et al. |
| 2007/0165377 A1 | 7/2007 | Rasmussen et al. |
| 2007/0167125 A1 | 7/2007 | Rasmussen et al. |
| 2008/0041076 A1 | 2/2008 | Tutunoglu et al. |
| 2008/0041077 A1 | 2/2008 | Tutunoglu |
| 2008/0053198 A1* | 3/2008 | Issel et al. .................. 73/40.5 R |
| 2008/0141703 A1 | 6/2008 | Bean, Jr. |
| 2008/0142068 A1 | 6/2008 | Bean et al. |
| 2008/0198549 A1 | 8/2008 | Rasmussen et al. |
| 2008/0245083 A1 | 10/2008 | Tutunoglu et al. |
| 2008/0307857 A1* | 12/2008 | Atiya ................................ 73/40 |
| 2009/0007591 A1 | 1/2009 | Bean et al. |
| 2009/0019875 A1 | 1/2009 | Fink et al. |
| 2009/0080173 A1 | 3/2009 | Porter et al. |
| 2009/0195977 A1 | 8/2009 | Fink et al. |
| 2009/0223240 A1 | 9/2009 | Bean, Jr. |
| 2009/0259343 A1 | 10/2009 | Rasmussen et al. |
| 2010/0061057 A1 | 3/2010 | Dersch et al. |
| 2010/0154438 A1 | 6/2010 | Bean, Jr. |
| 2010/0165572 A1 | 7/2010 | Fink et al. |
| 2010/0170663 A1 | 7/2010 | Bean, Jr. |
| 2010/0186517 A1 | 7/2010 | Bean, Jr. |
| 2010/0188816 A1 | 7/2010 | Bean, Jr. et al. |
| 2010/0269941 A1 | 10/2010 | Hara |
| 2010/0300129 A1 | 12/2010 | Bean, Jr. et al. |

FOREIGN PATENT DOCUMENTS

| | | |
|---|---|---|
| GB | 2260816 A | 4/1993 |
| WO | 2007022779 A1 | 3/2007 |

OTHER PUBLICATIONS

International Search Report for PCT/US2011/063724 mailed Apr. 12, 2012.

* cited by examiner

No water

Water

SYSTEMS AND METHODS FOR DETECTING LEAKS

BACKGROUND OF THE INVENTION

1. Field of Disclosure

Embodiments of the disclosure relate generally to detection systems, and more specifically to systems and methods for detecting leaks of fluid that may damage electronic equipment.

2. Discussion of Related Art

Equipment enclosures or racks for housing electronic equipment, such as data processing, networking and telecommunications equipment, have been used for many years. Such racks are often used to contain and to arrange the electronic equipment in large equipment rooms and data centers. Fluids and excessive moisture can cause untold damage to electronic equipment provided in data centers, as well as to the infrastructure of the data center. To detect leaks or condensation within a particular rack or a data center in general, there are two systems that are primarily used within the industry. One system is a spot detection system in which two or more electrical probes are used to measure some degree of conduction caused by fluid (e.g., water) on a surface. With spot detection, very little area can be covered. Another system is a rope detection system in which twisted conductors provided on a rope measure conduction. With rope detection, a larger area may be monitored. One issue associated with rope detection is that the system can be expensive and is subject to corrosion, which can be mitigated by applying control techniques. In addition, circuit impedances may affect the response time of the conduction between the twisted conductors that are subjected to water, for example.

BRIEF SUMMARY OF THE INVENTION

An aspect of the present disclosure is directed to a system for detecting leaks on a surface, such as a floor or a bottom of an equipment cabinet. In one embodiment, the system comprises a sound wave generator configured to generate sound waves, a tube having a first end coupled to the sound wave generator, a second end opposite the first end, and a plurality of openings formed in the tube, and a sound wave receiver coupled to the second end of the tube. The sound wave receiver is configured to detect sound waves generated by the sound wave generator that travel through the tube. The arrangement is such that sound waves are blocked from detection by the sound wave receiver when fluid enters the tube through the plurality of openings in the tube thereby indicating a fluid leak on the surface.

Embodiments of the system further include a device coupled to the sound wave generator. The device is configured to generate first signals and the sound wave generator is configured to generate sound waves in response receiving first signals from the device. In certain embodiments, the device is a waveform generator, the sound wave generator is a speaker, and the sound wave receiver is a microphone. The sound wave receiver is configured to generate second signals corresponding to the sound waves. The system further comprises an indication device coupled to the sound wave receiver. The indication device is configured to indicate a detected leak. In another embodiment, the system further comprises a controller coupled to the sound wave generator and the sound wave receiver. The controller is configured to detect a fluid leak when fluid enters the tube through the plurality of openings in the tube.

Another aspect of the disclosure is directed to a method of detecting fluid leaks on a surface, the method comprising: disposing a tube on the surface, the tube having a first end, a second end opposite the first end, and a plurality of openings formed therein; generating sound waves through the tube from the first end of the tube; and detecting sound waves from the second end of the tube. Sound waves are blocked from detection when fluid enters the tube through the plurality of openings in the tube to indicate a fluid leak on the surface.

Embodiments of the method include generating first signals in which the generation of sound waves is in response to receiving first signals. The first signals are generated by a waveform generator. The method further comprises generating second signals corresponding to the sound waves and indicating the second signals on an indication device. The second signals are generated by a microphone. The sound waves are generated by a speaker and detected by a microphone. The method further comprises indicating a detected leak.

A further aspect of the disclosure is directed to a system for detecting fluid leaks on a surface. In one embodiment, the system comprises a tube having a first end, a second end opposite the first end, and a plurality of openings formed in the tube. The system further comprises means for generating sound waves coupled to the first end of the tube, and means for detecting sound waves coupled to the second end of the tube.

In one embodiment, the system further includes means for indicating a detected leak.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Figure 1:
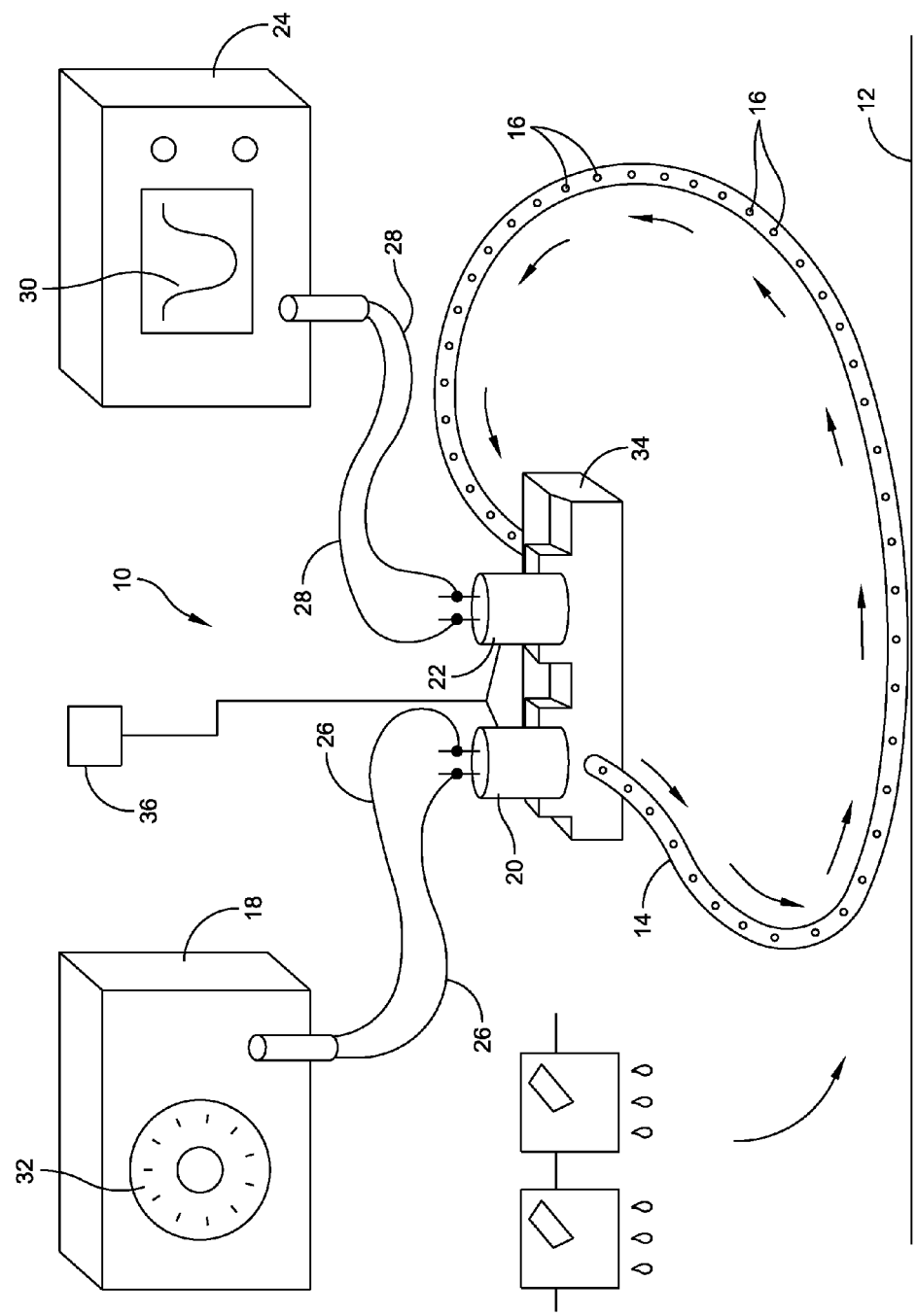
FIG. 1 is a schematic view of a leak detection system of an embodiment of the disclosure.

It is to be appreciated that embodiments of the systems and methods discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

At least one embodiment of the present disclosure is directed for use with electronic equipment that is housed within equipment enclosures or racks of a data center. As used herein, "enclosures" and "racks" are used to describe apparatus designed to support electronic equipment. Data centers are typically large rooms designed, in certain instances, to house hundreds of electronic equipment racks arranged in rows within the data center. Cooling equipment is provided in the data center to treat the hot air produced by the electronic equipment. During operation, the cooling equipment produces moisture and condensation from within the data center's environment, which may be excessive. In addition, certain cooling equipment is coupled to refrigerant distribution units or to chillers to assist in the operation of the cooling equipment. Leaks from hoses or connections of these units and chillers may produce fluid within the data center as well.

A system may be provided to detect fluid leaks within a particular equipment rack or on the data center floor. In one embodiment, the system includes a waveform generator that is configured to generate signals, referred to herein as first signals. The system further includes an ultrasonic speaker that is electronically coupled to the waveform generator. The ultrasonic speaker is configured to generate sound waves in response to receiving first signals from the waveform generator. A tube is connected to the ultrasonic speaker at one end of the tube. In a certain embodiment, the tube has a plurality of openings formed along the length of the tube. The arrangement is such that fluid, e.g., water or a refrigerant fluid such as glycol, can enter the tube when the tube is placed on the floor at a desired location. A second, opposite end of the tube is connected to an ultrasonic microphone, which is configured to detect sound waves generated by the ultrasonic speaker that travel through the tube. The ultrasonic microphone is configured to generate signals corresponding to the sound waves, referred to herein as second signals. The second signals can be represented or otherwise indicated on an indication device that is connected to the ultrasonic microphone. In operation, when a fluid enters the tube, sound waves traveling through the tube are blocked from detection by the sound wave receiver when fluid enters the tube through the plurality of openings in the tube thereby indicating a fluid leak on the surface on the indication device.

With reference to FIG. 1, a system for detecting leaks is generally indicated at 10. As shown, the system 10 is designed to detect fluid (e.g., water) on a surface 12, such as the floor of a data center or the bottom surface of an equipment rack. The system 10 can be positioned at any location where fluid or water detection may be required. For example, in addition to being used in the electronic equipment environment, the system 10 can be used in any commercial, industrial or residential environment. The provision of a system capable of detecting fluid leaks can save significant expense and inconvenience in the event of fluid or water damage to such equipment.

As shown, the system 10 includes several components capable of producing and detecting sound waves provided through a hollow tube 14 provided on the surface 12. In one embodiment, the tube 14 includes a plurality of openings, each indicated at 16, formed in the tube along its length so that when the tube is disposed in fluid, the fluid enters the tube through the openings. The tube 14 can be laid out on the floor (or other desired surface) so that the tube lies flat and will therefore be able to reliably detect fluid leaks when fluid enters the tube. In one embodiment, the tube 14 is fabricated from material so that the tube simply lies flat on the floor 12 with the openings 16 facing in a desired direction. In another embodiment, if desired, the tube 14 may be secured to the floor 12 with suitable fasteners (not shown), such as plastic clips. Alternatively, the tube 14 may be secured to the floor 12 by an adhesive or by zip-ties attached to other components proximate to the floor. As shown in FIG. 1, the openings 16 formed in the tube 14 are facing generally upwardly, but can be positioned so that they face the floor or sideways. The tube 14 can be fabricated from any suitable translucent material so that a person can visually identify fluid within the tube.

The components of the system 10 include a device 18 capable of producing electronic signals, a sound wave generator 20 capable of producing sound waves, a sound wave receiver 22 capable of detecting sound waves, and an indication device 24 capable of indicating or otherwise representing the sound waves. In one embodiment, the indication device is a display capable of displaying the sound waves. In another embodiment, the indication device is an alarm or a signal alerting the operator of the electronic equipment of the fluid leak. The device 18 is connected to the sound wave generator by two wires, each indicated at 26. The sound wave generator 20 is connected to one end of the tube 14 so that sound waves produced by the sound wave generator travel through the tube. The sound wave receiver 22 is connected to the other end of the tube 14. The arrangement is such that sound waves produced by the sound wave generator 20 travel through the tube 14 and are received or otherwise detected by the sound wave receiver 22. When only air is present in the tube 14, the sound waves travel unimpeded through the tube to the sound wave receiver 22. However, when fluid is present in the tube 14, sound waves are blocked by the fluid and are therefore undetected by the sound wave receiver 22. The sound wave receiver 22 is connected by two wires, each indicated at 28, to the indication device 24, which is capable of indicating or reproducing the sound waves detected by the sound wave receiver 22 on a screen 30.

In one embodiment, the device 18 is a waveform generator, which is configured to generate signals, referred to herein as first signals. The waveform generator 18 is a device which produces simple repetitive waveforms. In some models, the waveform generator 18 may include an electronic oscillator and a circuit that is capable of creating a repetitive waveform. In other models, the waveform generator 18 produces digital signals to synthesize waveforms, followed by a digital-to-analog converter to produce an analog output. A common waveform is a sine wave; however other waveforms may be produced, such as sawtooth, step, square and triangular waveforms. A dial 32 is provided on the waveform generator 18 to control the amplitude and the frequency of the first signals. In one embodiment, the frequency would be selected to match the optimal operation of the sound wave generator 20 and the sound wave receiver 22 within a specific range, e.g., ultrasonic sound waves of 40.0 KHz.

In one embodiment, the sound wave generator 20 is an ultrasonic speaker that is electronically coupled to the waveform generator 18 by wires 26. The ultrasonic speaker 20 is configured to generate ultrasonic sound waves in response receiving first signals from the waveform generator 18. The sound wave receiver 22 is an ultrasonic microphone that is electronically coupled to the indication device 24 by wires 28. The ultrasonic microphone 22 is configured to detect ultrasonic sound waves produced by the ultrasonic speaker 20 that travel through the tube 14. A housing 34 is provided to support the ultrasonic speaker 20 and the ultrasonic microphone 22. The housing 34 is configured to be attached to one end of the tube 14 so that connection between the ultrasonic speaker 20 and the tube is achieved. Similarly, the housing 34 is further configured to be attached to an opposite end of the tube 14 so that connection between the ultrasonic microphone 22 and the tube is achieved. The ultrasonic microphone 22 is configured to generate signals corresponding to the sound waves, referred to herein as second signals. The second signals can be shown on the screen 30 of the display 24 that is connected to the ultrasonic microphone 22.

In operation, when a fluid is on the surface 12 having the tube 14, sound waves traveling through the tube are blocked from detection by the ultrasonic microphone 22 when fluid enters the tube through the plurality of openings 16 in the tube. As will be described below, the display 24 indicates the fluid leak on the screen 30.

As discussed above, the second signals produced by the ultrasonic microphone 22 travel through the wires 28 provided to connect the ultrasonic microphone 22 to the display 24. The second signals represent the sound waves detected by the ultrasonic microphone 22. In one embodiment, the display 24 is an oscilloscope having the screen 30 that reproduces the sound wave. The oscilloscope (also known as a scope) is a type of electronic test instrument that allows observation of constantly varying signal voltages, usually on a two-dimensional graph. Oscilloscopes are commonly used to observe the exact wave shape of an electrical signal, which in this particular application is a reproduction of the sound waves. As mentioned above, in other embodiments, the display 24 can be in the form of a monitor or an alarm, which alarms an operator of the leak.

Figure 2:
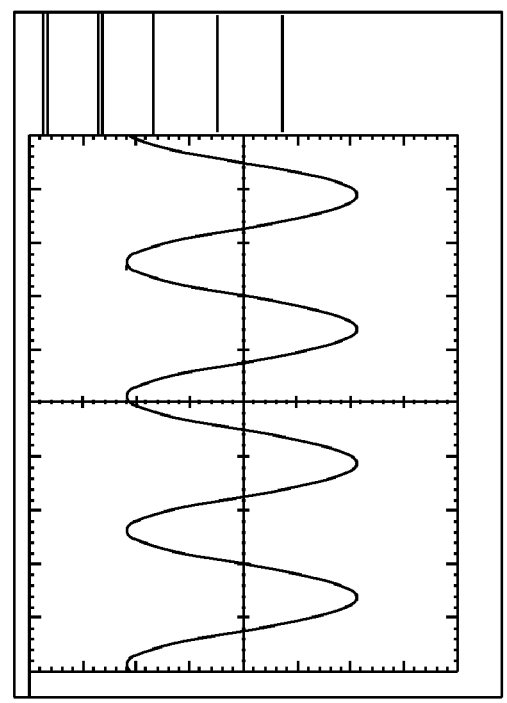
FIG. 2 is a graph representing sound waves through a tube unaffected by fluid in the tube.
Figure 3:
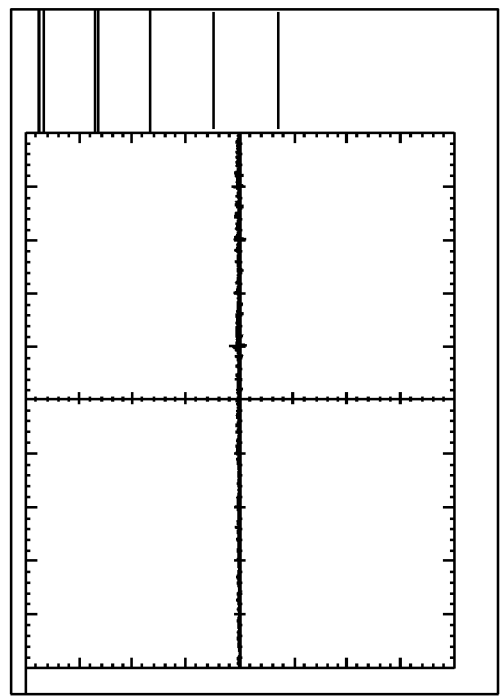
FIG. 3 is a graph representing sound waves through a tube affected by fluid within the tube.

During operation, the system 10 is located within a location in which fluid detection is desired. When no fluid or excessive moisture is present, then the sound waves generated by the ultrasonic speaker travel through the tube unimpeded so they are detected by the ultrasonic microphone. The ultrasonic microphone generates second signals that correspond to the sound waves, which are displayed on the oscilloscope. FIG. 2 is a view of a graph generated by the oscilloscope on the screen representing the sound waves traveling through the tube without being blocked or otherwise unimpeded by fluid within the tube. However, when fluid enters the tube, the sound waves are blocked and therefore not detected by the ultrasonic microphone. FIG. 3 is a view of a graph generated by the oscilloscope on the screen representing the lack of sound waves traveling through the tube. In FIG. 3, the sound waves are blocked by fluid in the tube. The sound wave receiver is capable of identifying a change in the sound waves as a result of fluid entering the tube. Thus, although sound waves may be able to be detected, the system 10 may be configured to identify a change in the sound waves thereby indicating that fluid is in the tube and a potential fluid leak is present.

In a particular embodiment, the system 10 may include a controller 36 that is coupled to the sound wave generator 20 and the sound wave receiver 22 to control the operation of the system. The controller 36 may be dedicated to the system 10, or may be provided as part of a master controller configured to control aspects of the data center or equipment racks provided in the data center. The controller 36 may be coupled to other components of the system 10, such as the waveform generator 18 and the indication device 24, as well.

Thus, it should be observed that a method of detecting fluid leaks on a surface may include disposing the tube on the surface, generating sound waves through the tube from the first end of the tube, and detecting sound waves from the second end of the tube. The arrangement is such that sound waves are blocked from detection when fluid enters the tube through the plurality of openings in the tube to indicate a fluid leak on the surface. The method also includes generating first signals in which the generation of sound waves is in response to receiving first signals, and/or generating second signals in which corresponding to the detected sound waves. The method also includes displaying the detected sound waves and indicating a detected leak.

It should be understood that the components of the system may configured to the particular environment in which the system operates. For example, the hollow tube may be selected to a predetermined length or may be cut on-site to a desired length. Also, it should be understood that although the system is configured to produce and detect ultrasonic sound waves, other wave-generating apparatus may be provided to achieve the desired result. In certain embodiments, the components of the system may be replaced with a sensor to detect fluid and convert an in-bound signal to a monitoring/alarming device. In other embodiments, a signaling system is provided. The signaling system may be a dedicated device associated with the system, or an appliance used to monitor other devices and systems within the data center. The signaling system may take the form of an alarm, buzzer or similar device suitable for capturing the attention of the operator of the system.

For example, the waveform may be generated by another technique, such as a specifically selected crystal oscillator driven circuit connected to an amplifier, or a digital signal provided in a larger apparatus that is "clocked" via apparatus software control, or deriving a digital clock signal of a desired frequency by dividing down another available digital clock within an apparatus, or using the system's audio port to generate a tone. In addition, the system may include multiple tubes to detect fluid leaks within the room or data center. Beyond the waveform generating techniques described herein, the detection of sound waves or signals may be performed by a frequency-tuned amplifying signal-level detector that merely outputs a two-state sentinel, or an analog-to-digital converter monitored and manipulated by appropriate software.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A system for detecting fluid leaks on a surface, the system comprising:
    a sound wave generator configured to generate sound waves;
    a tube having a first end coupled to the sound wave generator, a second end opposite the first end, and a plurality of openings formed in the tube;
    a sound wave receiver coupled to the second end of the tube, the sound wave receiver being configured to detect sound waves generated by the sound wave generator that travel through the tube; and
    a controller coupled to the sound wave generator and the sound wave receiver, the controller configured to detect a leak when fluid enters the tube through the plurality of openings in the tube.

2. The system of claim 1, further comprising a device coupled to the sound wave generator, the device being configured to generate first signals and the sound wave generator being configured to generate sound waves in response receiving first signals from the device.

3. The system of claim 2, wherein the device is a waveform generator.

4. The system of claim 3, wherein the sound wave generator is a speaker.

5. The system of claim 1, wherein the sound wave receiver is configured to generate second signals corresponding to the sound waves.

6. The system of claim 5, further comprising an indicator configured to indicate a detected leak.

7. The system of claim 5, wherein the sound wave receiver is a microphone.

8. The system of claim 1, further comprising an indication device coupled to the sound wave receiver, the indication device being configured to indicate a detected leak.

9. A method of detecting fluid leaks on a surface, the method comprising:
    disposing a tube on the surface, the tube having a first end, a second end opposite the first end, and a plurality of openings formed therein;
    generating sound waves through the tube from the first end of the tube; and
    detecting sound waves from the second end of the tube,
    wherein sound waves are blocked from detection when fluid enters the tube through the plurality of openings in the tube to indicate a fluid leak on the surface.

10. The method of claim 9, wherein sound waves are generated by a speaker.

11. The method of claim 9, wherein sound waves are detected by a microphone.

12. The method of claim 9, further comprising generating first signals, wherein the generation of sound waves is in response to receiving first signals.

13. The method of claim 12, wherein the first signals are generated by a waveform generator.

14. The method of claim 12, further comprising generating second signals corresponding to the sound waves and indicating the second signals on an indication device.

15. The method of claim 14, wherein the second signals are generated by a microphone.

16. The method of claim 9, further comprising indicating a detected leak.

17. A system for detecting fluid leaks on a surface, the system comprising:
    a tube having a first end, a second end opposite the first end, and a plurality of openings formed in the tube;
    means for generating sound waves coupled to the first end of the tube;
    means for detecting sound waves coupled to the second end of the tube; and
    controller means coupled to the sound wave generator and the sound wave receiver, the controller means configured to detect a leak when fluid enters the tube through the plurality of openings in the tube.

18. The system of claim 17, further comprising indicating a detected leak.

* * * * *